United States Patent
Christensson

[15] 3,690,091
[45] Sept. 12, 1972

[54] METHOD FOR THE PRODUCTION OF A PACKAGE, PREFERABLY FOR DRY AND FROZEN MATERIAL

[72] Inventor: Od Wilkar Christensson, Bromma near Stockholm, Sweden

[73] Assignee: Christenssons Maskiner & Patentar Aktiebolag, Bromma near Stockholm, Sweden

[22] Filed: Aug. 20, 1970

[21] Appl. No.: 65,429

[52] U.S. Cl...............53/42, 93/36 M, 93/49 M, 93/39.1 P, 93/55.1 P, 93/59 MT, 93/59 PL
[51] Int. Cl...........B65b 7/28, B31b 1/52, B31b 1/64
[58] Field of Search ..93/36 M, 39.1 P, 49 M, 55.1 P, 93/42, 35 PC, 61 A, 59 MT, 59 PL; 53/42, 284

[56] References Cited

UNITED STATES PATENTS

| | | | |
|---|---|---|---|
| 2,869,440 | 1/1959 | Zerlin | 93/55.1 P |
| 3,104,599 | 9/1963 | Carpenter | 93/55.1 P |
| 2,409,460 | 10/1946 | Waters | 93/55.1 P |
| 1,384,049 | 7/1921 | Coates | 93/55.1 P |
| 2,665,616 | 1/1954 | Jungmayr | 93/55.1 P |
| 2,784,892 | 3/1957 | Feher | 93/55.1 P |
| 2,723,604 | 11/1955 | Fischer | 93/61 A |
| 3,565,730 | 2/1971 | Weisshuhn | 93/61 A |
| 3,000,157 | 9/1961 | Ollier | 93/35 PC |
| 3,416,292 | 12/1968 | Weber | 93/35 PC |
| 2,956,484 | 10/1960 | Subklew | 93/61 A |
| 3,429,237 | 2/1969 | Subklew | 93/61 A |
| 3,621,637 | 11/1971 | Sternau | 53/42 X |
| 3,628,301 | 12/1971 | Vermeulen | 53/42 X |

FOREIGN PATENTS OR APPLICATIONS

| | | | |
|---|---|---|---|
| 1,027,974 | 4/1958 | Germany | 93/55.1 P |

*Primary Examiner*—Wayne A. Morse, Jr.
*Attorney*—Larson, Taylor and Hinds

[57] ABSTRACT

A method for forming a package having a stiff tubular base portion and flexible end closures over one or both ends. The end closure piece is engaged by a suction device mounted in and movable through a welding head, and when so held it is placed onto an open end of the base portion. The welding head then moves relative to the suction device to urge the end closure piece onto the end of the package and to heat seal the same.

6 Claims, 6 Drawing Figures

Fig.5

PATENTED SEP 12 1972 3,690,091

INVENTOR
OD W. CHRISTENSSON

BY Larson, Taylor and Hinds
ATTORNEYS

INVENTOR
OD W. CHRISTENSSON

METHOD FOR THE PRODUCTION OF A PACKAGE, PREFERABLY FOR DRY AND FROZEN MATERIAL

Within the packaging industry attention has to a continuously increasing rate been directed upon the task of making the manufacture more cheap, especially in the respect that the consumption of material should be the smallest possible. Tests, which have been made, have shown that a very essential decrease of material used may be achieved, if the package blanks are made in such a way that the waste material occuring will be a minimum. The waste material occuring in the first place is situate in the corner surfaces and the like appearing between the side surfaces of the package and its parts forming the closing flaps. The more the package blank approaches to a completely rectangular outer contour, the less will the waste material be, and the greater will the number of package blanks be, which may be stamped out from a given piece of cardboard.

The packages, however, also must be reasonably tight. In many a case such a complete tightness is required, that a vacuum existing inside of the package shall not be destroyed by penetrating air, and in such a case one may scarcely cause any more essential decrease of material in the above mentioned way. In other cases, however, the demands for tightness are not so strong but nevertheless one requires to get the best possible tightness. This is especially the case, when the question is one about closing the moisture of the exterior air out from the package or from preventing moisture or liquid to leak out from the package. The first mentioned is the case when dried products are packed, the last mentioned for instance when packing frozen products. As an example of dry products, cakes, roasted nuts and almonds, chips and so on may be mentioned. As an example of frozen products, ice cream may be mentioned. As an example of deep frozen products many different kinds of cooked vegetables may be mentioned, which may be frozen in liquid in order to retain their moist consistency.

One has tried to satisfy both of the above mentioned demands, that means firstly decrease of the material in connection with stamping out the package blanks, and secondly also at least approximately satisfactory tightness of the package, by means of a package of polygonal, preferably rectangular cross-section, which is produced by folding a piece of cardboard along given creasing lines, whereby pasting flaps are arranged at the upper and perhaps also at the lower end of the package, an end closure piece of thinner, easily bendable material being attached to said pasting flaps.

Packages of the above mentioned kind suitably are produced by first stamping out a package blank, containing all of the four sides of the package to be formed, as well as a connection flap, applied at the outer edge of one side and intended to be connected to the edge of another side placed at the opposite side of the package blank. Such a package may thus be formed with a cross-section of rectangular form. Hitherto one believed that when a bottom was applied on such a package, then one had to place a mandrel into the interior of the package for supporting this from inside against the pressure required to attach the bottom. Of course, it is without importance for the invention, how the pressure on the outer side of the package is applied later on but before the folding of the package into a rectangular cross-section and when a bottom is mentioned in this connection, then what is meant is that bottom which is turned downwardly when filling material into the package, even if said bottom should later on appear as the top of the package with respect to the print on the outside of the package.

After the bottom has been mounted in this way under use of an internal mandrel, the package is filled with material to be packed, the top closure is now applied. Certainly, it is very seldom that the material filled into the package fills this out so well and has such a rigid consistency that this material may serve for the same purpose as the mandrel just mentioned. When applying the top closure one has therefore believed that a top closure of the same kind as the bottom closure would not be possible, because no mandrel can be applied into the interior of the package, which is certainly at that time already closed at its bottom. Different proposals have been made for solving the problem how to apply the top closure on the package, but the only one of these proposals, which has been functionable in practice, comprised forming the top closure weakly cup-formed, so that its outer circumference was exactly adapted to the interior of the four package sides. One could then press this cup-formed top closure into the package, and thereby one could either use the cup-formed top closure in the impressed part of the package as a mandrel, or one could in this cup-formed top closure introduce a separate, rather short mandrel. Thereafter it has been possible to turn around the remaining edges of the top closure against the outer side of the four sides of the package, so that a closer was created.

Such a method is extremely time consuming and complicated, and further it does not satisfy the demand for a minimum of material, because the extending edging, created at this method of closing, means both a surplus of material in the sides of the packages, which seems to be unnecessary, and surplus of material in the top closure, which also seems to be unnecessary.

Attachment of the bottom closure and/or the top closure to a package of the type concerned in practice takes place reasonably without exception by plastic welding, the package being laminated by plastic at least on its outer side but preferably both on its inner side and its outer side, said package also having a core of cardboard. Also the bottom closure and/or the top closure thereby should be made of a plastic laminated material, so that one may by a welding step cause the plastic on the outer side of the sides of the packages and the plastic on the inner side of the bottom closure or the top closure, resp., to attach to each other by welding.

The present invention is now based upon the idea that one should use for the bottom closure and/or the top closure a thin, preferably homogenous plastic foil, which due to its character and its small thickness is easily formable. Due to the good formability of the plastic foil, the same strong pressure is no longer required to fix the plastic foil to the package pressure, which was earlier thought required, when one used a thicker and stiffer material for the bottom closure and the top closure. The question then arises, how one could apply the bottom and/or top closure made of such thin plastic foil on the remaining package formed by the sides.

Care must be taken that the bottom closure or the top closure, resp., is applied completely over the bottom opening or the top opening, resp., of the package, without any depression for forming such a border, as mentioned above, being required. Thereby, however, one will loose the guiding action between the closure, on the one hand, and the package sides, on the other hand, which one obtained in the old method when the border was formed.

According to the invention the foil, which shall form the bottom closure and/or the top closure, is brought in position against the lower or the upper mouth, respectively, of the package by means of a tool, comprising a disc with suction nozzles introduced in it, and the bottom and/or top closure is attached to the pasting flaps and/or the upper edge parts of the package sides, whereafter the suction action of the suction nozzles is released, and they are removed.

The invention will be further described below in connection with one form of execution, shown in the attached drawings, but it is understood that the invention is not limited to this specific form of execution, but that all different modifications may occur within the frame of the invention.

Figure 1:
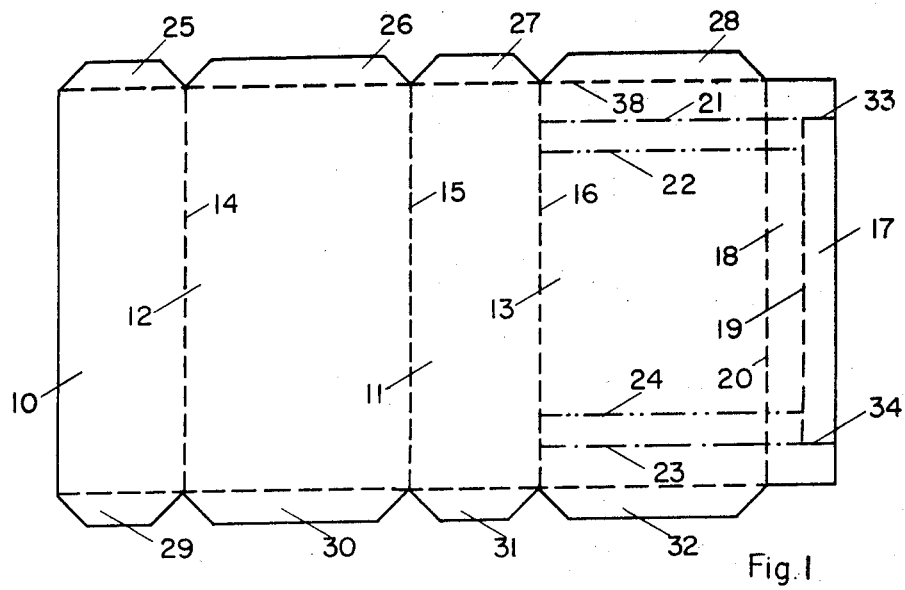
FIG. 1 shows the cardboard blank of the package after it has been stamped out and creased.

The package blank according to FIG. 1 contains two short sides 10 and 11 and two long sides 12 and 13, separated by means of creasing lines 14, 15 and 16. Further there is a closing flap, comprising two parts 17 and 18 mutually separated by means of a creasing line 19 and connected to the long side 13 by means of a second creasing line 20. The part 18 is intended to form the proper closing flap, which should be attached to the edge of the short side 10 when the package has been folded into its form rectangular in cross-section, whereas the part 17 is intended as a grip tongue for opening the package. For making the opening of the package more easy, a perforation device is also made. This may be of any kind known per se, and it may comprise cuts, arranged in pairs, which however do not run completely through of the thickness of the cardboard. In each couple of such insertion lines the one is cut in from the front side of the cardboard and the other one from the back side. For marking this, the line cut from the outer side of the cardboard has been indicated in the drawing by means of a line, composed alternatively by one dash and one dot, whereas the line cut into the inner side of the cardboard has been indicated by alternatively one dash and two dots. The two lines 21 and 22 or 23 and 24 consequently will give a tearing device easy to open, at the opening of which the cardboard will be slotted between the two insertion lines, contained in one single pair of such lines.

At each end of the four sides 10, 11, 12 and 13 of the package, further pasting flaps 25 – 28 and 29 – 32, resp., are arranged. These flaps, which are also referred to as closure flaps, are cut in a sloping direction at their ends, so that when the package is folded into its form rectangular in cross-section, then the edges will meet each other in 45° angles, as seen from FIG. 2.

In order that the part 17 shall serve as a grip tongue for an easy opening of the package, it should be free from the package in other parts than along the creasing line 19, and for this reason, already at the stamping out of the package blank, cuts 33 and 34 were arranged at the ends of the inner part of the grip tongue 17. The shorter pieces of the part 17 outside of these cuts therefore are attached to the surface of the proper closing flap 18 without perforation or creasing.

Figure 2:
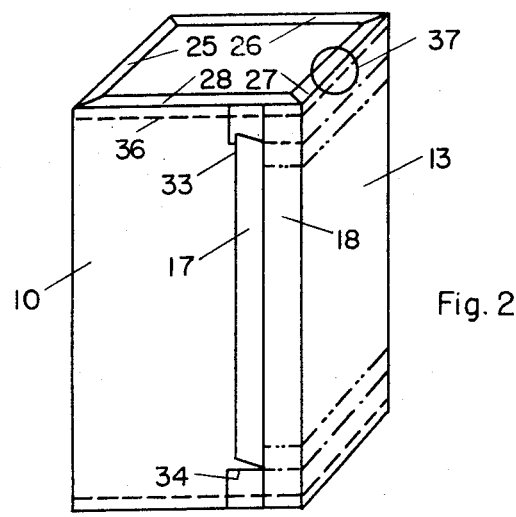
FIG. 2 shows a parallel perspective view of the finished package according to the already proposed method for its closing.

When folding the package blank according to FIG. 1 into a package, the four sides 10, 11, 12 and 13 are bent perpendicularily to each other, and the flaps 25 – 28 and 29 – 32 are folded inwardly at least approximately at right angles to the levels of the sides concerned. The inner side of the flap 18 and/or the outer side of the edge of the side 10 is provided with paste, glue or some other means for joining together the package, and one then has a package, shaped as shown in FIG. 2, after the flaps 25 – 32 have been provided in the way indicated below with their end closing parts. One will see that the tearing tongue is inclined at a small angle, so that this tongue is easily available for opening the package.

In practice it will occur as a rule that the package has been produced by a given manufacturer of packages, delivering the package in an evenly collapsed state to the enterprise, which will pack its products therein. Thereby it is quite natural that the package is folded a full 180° along the creasing lines 14 and 16, whereas, on the other side, the creasing lines 15 and 20 are left unfolded whereafter the glueing by means of the tongue 18 takes place. The user of the package thereafter has to break it up into its form rectangular in cross-section before closing it in the below indicated way.

It is especially suitable to make the package blank from a cardboard covered on both sides by a thermoplastic. The attachment along the flap 18 then takes place by plastic welding under addition of heat.

Figure 3:
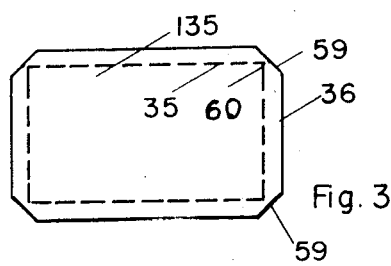
FIG. 3 is a plan view of the end closing part.

An end closure is shown in FIG. 3. This end closer is made from a rather thin and easily bendable foil of a formable plastic material which is heated weldable. It is applied over the still open mouth of the package according to FIG. 2, so that the dotted lines 35 will correspond to the creasing lines between the sides 10 – 13 of the package and the flaps 25 – 28 or 29 – 32, resp., connected to them. One has cut out the plastic piece somewhat bigger than the upper sides of the package, so that it will have an edge all around to be folded down against the sides of the packages. In this way one has with a minimum of stamping waster material provided a package, which one believed when carefully closed to be hermetically tight. To the question of this tightness we will return below.

Figure 4:
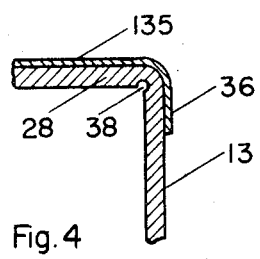
FIG. 4 shows in an increased scale a section through the edge part of the package which has been surrounded in FIG. 2 by a circle.

FIG. 4 shows in enlarged scale the piece of FIG. 2 which has been surrounded by the circle 37. The creasing line 38, as one will see, is folded at a 90° angle, so that the side 13 and the flap 28 will be opposite to each other connected by a slight rounding, and the end closure 135 will be attached to the flap 28 and the folded down edge part 36 to the side 13.

The arrangement used for causing the fixture of the end closure, of course, will either be the same or different at the lower end at the upper end of the package since the package is usually empty when it is closed at its lower end but it is filled when closed at its upper end. Consequently, one may if desired put a mandrel into the package when closing the lower end, but one should use suction nozzles according to the present invention at the closure of the upper end of the package. The closing of the end of the package under insertion of the mandrel is extremely well known, and therefore no specific description thereof would be required, but it is probable that it has not earlier happened that one used suction nozzles for preventing the upper piece from being sucked down into the package, and therefore the arrangement according to FIG. 6 has been shown using this procedure.

Figure 6:
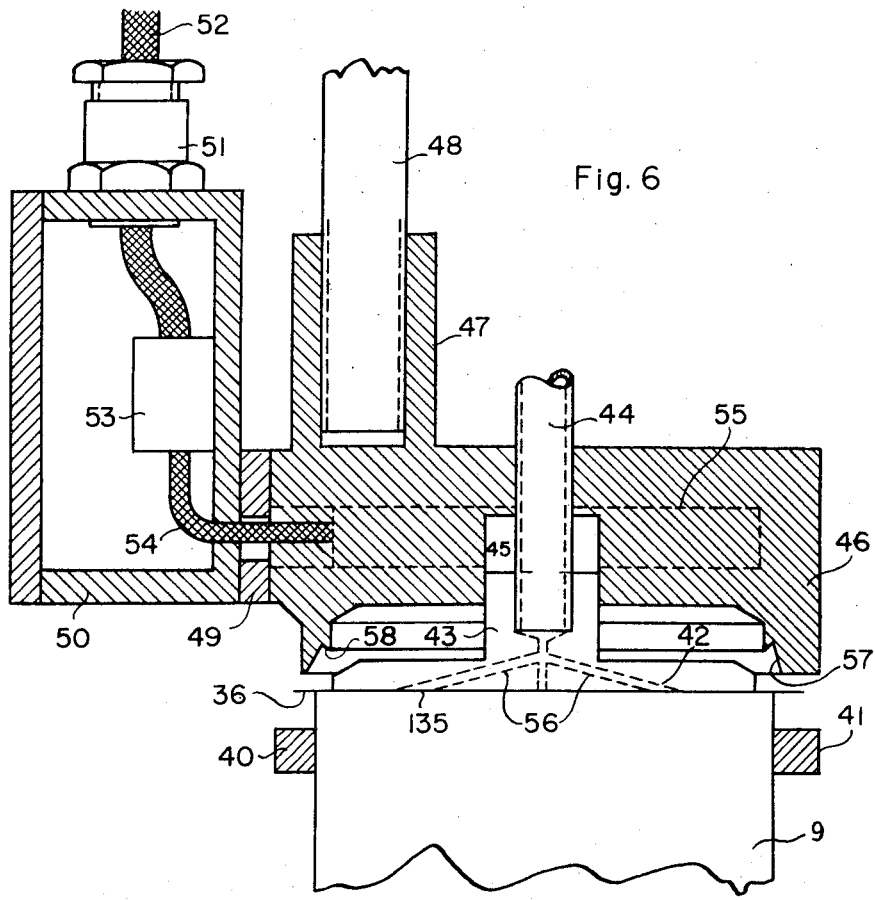
FIG. 6 shows a tool for preparing the closing schematically indicated in FIG. 5.

The package 9 has been shown in FIG. 6, kept in place between a couple of arms 40 and 41. Of course, it may also be supported on a table, which has not been shown in the drawing. The end closure 135 extends in a way already described with its edges 36 outside of the upper edge of the package 9. This end closure 135 is kept in place by means of a suction nozzle device 42 with a head 43, carried up by a hollow shaft 44, so that it can be displaced along with the head 43 with a cavity 45 in the welding head 46. The welding head 46 is also referred to as a pressing head. The welding head 46 in its turn is carried up by a head 47, in which a second control shaft 48 meshes. Further, the welding head 46 carries by means of a thermically insulating piece 49 a coupling box 50, in which by means of the bushing 51 an electrical cable 52 is carried for feeding electrical current. The cable 52 runs through a connection plinth 53, from which conductors 54 run to one or a plurality of heater elements 55 in the interior of the welding head 46.

The arrangement now described functions in the following way.

At a time when the suction nozzle device 42 is drawn into the cavity within the welding head 46, the welding head along with the suction nozzle device is turned about the shaft 48 to a position completely outside of the range of the package 9. Instead, the welding head along with the suction nozzle device may be displaced sidewardly, but in either case a relative movement takes place between the suction nozzle device along with the welding head, on the one hand, and the package 9 held between the arms 40 and 41, on the other hand. One may also arrange the welding head 46 along with the suction nozzle device 42 in fixed place, and make the arms 40, 41 along with the package 9 movable.

At the time when the welding head 46 along with the suction nozzle device 42 is in this way not exactly above a package, these parts are situated exactly above a pile of ready cut out closure pieces 135. The suction nozzle device 42 thereby is lowered down onto said pile, and vacuum is fed through the conduit 44 to the different suction nozzles, which are, through the conduits 56, in connection with the conduit 44. The uppermost closure piece 135 thereby attaches to the lower side of the suction nozzle device 42. Thereafter also a return displacement is provided between the welding head 46 along with the suction nozzle arrangement 42, on the one hand, and the package 9, which is retained between the arms 40 and 41, on the other hand, so that the closure piece 135, held by the suction nozzle device will be in correct position above the package 9. By means of the shaft 44 thereafter the suction nozzle device 42 is lowered down, until the closure piece 135 is exactly tight on the upper edge of the package 9.

Figure 5:
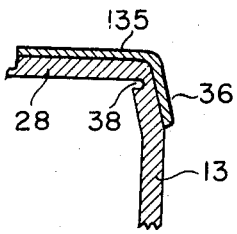
FIG. 5 shows the corresponding corner or edge part, modified according to the present invention.

Already earlier electric current has been fed through the cable 52, the distribution plinth 53 and the cables 54 to the heater elements 55, so that the welding head 46 has assumed the temperature required for the welding. By means of the shaft 48 thereafter the welding head 46 is lowered down over the package 9 along with the end closure 135. Thereby the welding head 46 will by means of the wedge-formed, sloped surface 57 first press down the surplus part 36 of the end closure 135 against the sides of the package 9 and thereafter press the upper edge part of these sides along with the free edge 36 of the end closure 135, so that a deformation will take place simultaneously with a compression of all of the faults, which could have been created in the edge part 36 of the end closure 135, and the package will in its upper part take the form which is shown in enlarged scale in FIG. 5.

It cannot be avoided that a given heat quantity is also transferred from the welding head 46 to the central part of the end closure 135 which remains level. The outermost parts of this even part of the end closure 135 therefore will also fold themselves under extension of surface, and it may then be important in some regular way to assume this folding action in order, when cooling the end closure again to make the received part free. Amongst others, it is for this reason that the welding head has been provided inside of the sloped surface 57 with a teeth formed border 58, running all around and so arranged that it will mesh inside of the edge of the package 9 and there press the outermost part of the end closure 135 down with a slight pressure onto the package edge surface by heat development. This arrangement, however, has also a further purpose, which may be regarded at least as important, viz. to make sure that the welding bond between the edge 36 of the end closure 135 and the edge of the package 9 will extend around the upper edge and thereby exist against the edge part of the outer side of the package as well as against the narrow closing flaps, which may temporarily by the pressure from the tooth 58 have been bent somewhat downwardly, but after lifting of the welding head they will again by the resilient force in the creasing lines assume their position perpendicular to the package sides.

After the closure 135 has in this way been attached to the package 9, one releases first the conduit 44 – 56 from vacuum, so that the suction nozzle device 42 will release its grip relative to the closure 135, whereafter the suction nozzle device is, by means of the hollow shaft 44 elevated up into the hollow part in the interior of the welding head 46. The welding head 46, thereafter, is displaced or turned out of position above the package 9, or alternatively the package 9 is displaced out of position under the welding head 46.

It will be evident from the above that one may by means of the described method keep the closure 135 completely even, during the time when it is attached to the edges of the package 9, without introducing a mandrel into the interior of the package, which would not even be possible with the top closure. However, it should be observed that the same arrangement may without any difficulty be used for both the bottom closure and the top closure. This is of very great importance, because the movement, which a mandrel has to execute, if such a mandrel is used at the bottom closure, will take considerable time, whereas the arrangement according to the present invention may work essentially quicker. Hereby an essential gain of time will be created, and thereby also the working capacity of the machine will be increased.

I claim:

1. A method for producing a package, comprising the steps of: forming a relatively still material into a generally tubular base portion having sides forming a polygonal cross-section and open at at least one end, with closure flaps extending inwardly from the sides at said one end, placing over said one end a generally flat end closure piece which is thin and very flexible relative to the said stiff base portion by grasping said end closure piece with a suction holding tool, and then locating the end closure piece onto the said one end such that it lies on the said closure flaps and parts of the end closure piece extend outwardly beyond the sides of the base portion, and while the end closure piece is still held by the suction holding tool, attaching the end closure piece to said one end by urging it against the closure flaps and also by folding over the said parts of the end closure piece that extends outwardly beyond the sides of the base portion by moving a pressing head towards the said one end, relative to the suction tool, and attaching said parts to the outside of the tubular base portion sides adjacent said one end, all about the periphery of said one end, and then removing the suction holding tool and the pressing head from the end closure piece.

2. A method according to claim 1, wherein the base portion is rectangular in cross-section, the end closure piece is a plastic film, and wherein an end closure piece is placed and attached at both ends of the tubular base portion.

3. A method according to claim 1, wherein the step of placing the generally flat closure piece includes locating the base portion, moving the suction holding tool to a position to one side of the base portion and, with its suction holding force, picking up and end closure piece from the top of a pile of end closure pieces, and moving the suction holding device to a position over the said one end of the base portion.

4. A method according to claim 1, wherein the step of attaching the end closure piece includes heat welding it to the said one end of the package.

5. A method according to claim 1, the suction holding tool being mounted in and movable longitudinally through said pressing head, said pressing head being a welding head, and wherein the step of placing the generally flat end closure piece includes moving the suction holding tool towards the said one end of the base portion, after which the said step of attaching the end closure piece is performed by moving the welding head towards the said one end, relative to the suction holding tool, such that the welding head surrounds the suction holding tool and heat seals the end closure piece onto the said one end of the package.

6. A method according to claim 5, in which the suction force is removed from the suction holding tool after the end closure piece has been welded to the package, after which the suction holding tool is moved into the interior of the welding head.

* * * * *